(12) United States Patent
Jiang et al.

(10) Patent No.: US 8,241,536 B2
(45) Date of Patent: Aug. 14, 2012

(54) PROCESS FOR MAKING A COATED OPTICAL LENS FREE OF VISIBLE FINING LINES

(75) Inventors: Peiqi Jiang, St. Petersburg, FL (US);
Steven Weber, St. Petersburg, FL (US);
Fadi O. Adileh, St. Petersburg, FL (US)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 319 days.

(21) Appl. No.: 10/596,977

(22) PCT Filed: Dec. 30, 2004

(86) PCT No.: PCT/EP2004/014882
§ 371 (c)(1),
(2), (4) Date: May 14, 2007

(87) PCT Pub. No.: WO2005/063473
PCT Pub. Date: Jul. 14, 2005

(65) Prior Publication Data
US 2007/0296094 A1    Dec. 27, 2007

Related U.S. Application Data

(63) Continuation-in-part of application No. 10/750,145, filed on Dec. 31, 2003, now abandoned.

(51) Int. Cl.
*B29D 11/00* (2006.01)
*B29C 39/10* (2006.01)
(52) U.S. Cl. ........... 264/1.7; 264/2.7; 427/162; 427/164
(58) Field of Classification Search .................... 264/2.7, 264/1.7; 427/162, 164
See application file for complete search history.

(56) References Cited

U.S. PATENT DOCUMENTS 3,458,348 A * 7/1969 Sherman ................. 428/422
(Continued)

FOREIGN PATENT DOCUMENTS
JP    2000-241608    9/2000
(Continued)

OTHER PUBLICATIONS

Office Communication, issued in Japanese Patent Application No. 2006-546127, dated Dec. 21, 2010. (English translation).

*Primary Examiner* — Richard Crispino
*Assistant Examiner* — Robert Dye
(74) *Attorney, Agent, or Firm* — Fulbright & Jaworski L.L.P.

(57) ABSTRACT

The invention concerns a process for making a coated optical lens blank free of visible fining lines which comprises: (ix) providing an optical article having at least one fined but unpolished geometrically defined main face; (x) providing a mold part having an internal and external surface; (xi) depositing on said main face of said optical article or on the internal surface of the mold part a requisit amount of a liquid curable coating composition; (xii) moving relatively to each other the optical article and the mold part to either bring the coating composition into contact with the main face of the optical article or into contact with the internal face of the mold part; (xiii) applying pressure to the mold part to spread the liquid curable coating composition on said main face and form a uniform liquid coating composition layer onto the main face; (xiv) curing the liquid coating composition layer; (xv) withdrawing the mold part; and recovering the free of visible fining lines coated optical article.

43 Claims, 2 Drawing Sheets

U.S. PATENT DOCUMENTS

| | | | |
|---|---|---|---|
| 4,319,945 A | 3/1982 | Howden | 156/212 |
| 4,332,861 A | 6/1982 | Franz et al. | 428/520 |
| 4,417,790 A | 11/1983 | Dawson et al. | 351/166 |
| 5,254,000 A | 10/1993 | Friske et al. | 425/595 |
| 5,411,430 A | 5/1995 | Nishimura et al. | 451/1 |
| 5,512,371 A | 4/1996 | Gupta et al. | 428/412 |
| 5,753,301 A | 5/1998 | Brytsche et al. | 427/162 |
| 6,489,028 B1 | 12/2002 | Degand et al. | 428/423.1 |
| 6,491,851 B1 | 12/2002 | Keller et al. | 264/1.32 |
| 6,562,466 B2 | 5/2003 | Jiang et al. | 428/412 |
| 6,565,776 B1 | 5/2003 | Li et al. | 264/2.5 |
| 2002/0034630 A1 | 3/2002 | Cano et al. | 428/331 |
| 2005/0043430 A1 | 2/2005 | Weber et al. | 522/114 |
| 2005/0250870 A1 | 11/2005 | Jallouli | 522/182 |
| 2005/0269721 A1 | 12/2005 | Adileh et al. | 264/1.32 |

FOREIGN PATENT DOCUMENTS

| | | |
|---|---|---|
| WO | WO 99/29494 | 6/1999 |
| WO | WO 01/67139 | 9/2001 |
| WO | WO 03/004255 | 1/2003 |

\* cited by examiner

PROCESS FOR MAKING A COATED OPTICAL LENS FREE OF VISIBLE FINING LINES

BACKGROUND OF THE INVENTION

This application is a national phase application under 35 U.S.C. §371 of International Application No. PCT/EP2004/014882 filed 30 Dec. 2004, which claims priority to U.S. application Ser. No. 10/750,145 filed 31 Dec. 2003. The entire text of each of the above-referenced disclosures is specifically incorporated herein by reference without disclaimer.

The present invention relates to a process for making a coated optical article, in particular an ophthalmic lens, a lens blank or a lens mold, free of visible fining lines, and in particular for directly forming a functional coating, such as an anti-abrasion hard coating, onto a fined but unpolished main face of an optical article, whereby no fining lines are visible when the coated lens blank is illuminated with an arc lamp. This process may be designated as "press coating process".

The main faces of an ophthalmic lens blank, such as a lens blank made of a transparent plastic material, are classically subjected to a surface mechanical treatment.

This mechanical treatment comprises a group of operations leading to the production of a lens blank whose main faces are perfectly polished and have the desired curvatures (optical powers).

The mechanical treatment typically comprises three successive steps: grinding, fine grinding (also called fining) and polishing.

Grinding is a mechanical processing step intended to create the curvature on the face of the lens blank.

Fine grinding (fining), performed after grinding further changes the geometry of the treated face of the lens blank but can lead to a translucent lens blank whose treated face still shows, significant surface roughness. Typically, the Rq of the fined face is above 0.1 µm, and preferably ranges from 0.05 to 1.5 µm, more preferably from 0.1 to 1.0 µm.

Finally, the polishing, a relatively long mechanical processing step, which does not change the geometry of the treated face, removes the remaining roughness as far as possible to give the final transparent lens blank. Typically, the surface roughness Rq of the polished face of the lens blank ranges under 0.01 µm, preferably around 0.005 µm.

Following the mechanical treatment, functional coatings such at primer coating, impact-resistant coating, anti-abrasion hard coating, anti-reflective coating and top coat are classically deposited on the mechanically treated main face of the lens blank.

Avoiding the cumbersome polishing step of the main face of the lens blank prior forming a functional coating on the main face of the lens blank would thus be a definitive advantage for both economy and environment.

U.S. Pat. No. 4,417,790 and international patent application WO 01/67139 disclose spin or dip coating a fined but unpolished main face of a lens. The coating thickness is at least more than 10 times higher than the surface roughness of the fined main face and in WO 01/67139 application the difference of value of the refractive indexes between the lens material and the coating material shall be less than 0.01. Although the resulting coating lens becomes transparent using such a coating thickness or refractive index matching, the fining lines on the lens main face, i.e. the lines resulting from the fine grinding processing step, remain visible in particular when the coated lens is illuminated by an arc lamp.

U.S. Pat. No. 6,562,466 discloses a process for transferring a coating onto a main face of a lens blank which comprises depositing a requisite amount of a curable glue on a main face of a lens blank, bringing a coating born by a flexible support in contact with the curable glue, applying a pressure to the flexible support to spread the glue and form a uniform layer of glue on the main face of the lens, curing the glue and withdrawing the support, whereby one recovers a lens blank having the coating adhering to the main face of the lens blank.

Although coated lens blank free of visible fining lines may be obtained with the above coating transfer process, the thickness of the final coating including the cured glue layer and the transferred coating is typically of 25 µm or more and the transferred coating comprises several layers of different chemistry.

Applicant has now found that it is possible to make a coated optical article, especially a lens blank, free of visible fining lines in which the coated main face of the article is merely fine grinded but not polished and even though the coating is a thin coating, for example has a thickness of 10 µm or less, and/or the refractive index difference between the coating and the article, in particular a lens blank, is high, for example is up to 0.05, even 0.1 or more.

Other classical spin, dip or flow coating cannot lead to an article free of visible fining lines when the article is illuminated by an arc lamp.

SUMMARY OF THE INVENTION

This is an object of the invention to provide a process for making a an optical article free of visible fining lines, in which the coating is directly formed on a fined but unpolished main surface of the article;

It is a further object of the invention to provide a process as defined above in which the coating has a thickness of 50 µm or less;

It is also an additional object of the invention to provide a process as defined above in which the difference in the refractive index values between the coating and the lens blank may be up to 0.1 and more.

In accordance with the above objects and those that will be mentioned and will become apparent below, the process for making a coated optical article free of visible fining lines according to the invention comprises:
  (i) providing an optical article having at last one fined but unpolished geometrically defined main face;
  (ii) providing a mold part having an internal and an external surface;
  (iii) depositing on said main face of said optical article or on the internal surface of the mold part a requisite amount of a liquid curable coating composition;
  (iv) moving relatively to each other the optical article and the mold part to either bring the coating composition into contact with the main face of the optical article or into contact with the internal surface of the mold part;
  (v) applying pressure to the mold part to spread the liquid curable coating composition on said main face and form a uniform layer of the liquid coating composition onto the main face;
  (vi) curing the liquid coating composition layer;
  (vii) withdrawing the mold part; and
  (viii) recovering a free of visible fining lines coated optical article.

Preferably, the pressure is maintained during the curing step.

By a requisite amount of liquid curable coating composition one means at least a sufficient amount for forming a final coating covering the entire surface area of the main face to be coated.

The present invention also concerns a process for making a coated article whose main surface has a surface state corresponding to a polished stated which comprises:

(i) providing an article having at least one fined but unpolished geometrically defined main face;
(ii) providing a mold part having an internal and external surface;
(iii) depositing on said main face of said article or on the internal surface of the mold part a requisite amount of a liquid curable coating composition;
(iv) moving relatively to each other the article and the mold part to either bring the coating composition into contact with the main face of the article or into contact with the internal face of the mold part;
(v) applying pressure to the mold part to spread the liquid curable coating composition on said main face and form a uniform liquid coating composition layer onto the main face of the article;
(vi) curing the liquid composition layer;
(vii) withdrawing the mold part and
(viii) recovering the coating article having a surface state corresponding to a polished state.

The following description will be made referring in most of the cases to a lens blank.

The lens blank for use in the present process may be made of any transparent plastic material typically used for making optical lenses and in particular ophthalmic lenses. Among the preferred plastic materials there may be cited diethylene glycol bis-allyl carbonate (such as CR 39® from PPG INDUSTRIES), polycarbonates (PC), polyurethanes, polythiourethanes, poly(meth)acrylates and polyepisulfide based polymer and copolymers.

The plastic material may optionally contain one or more photochromic material. Also, the lens blank material may be tinted.

At least one main face of the lens blank to be coated using the process of the invention has been fined but unpolished. Typically, such a fined but unpolished main face will have a $R_q$ of 0.05 to 1.5 µm, preferably of 0.1 to 1.0 µm. When the lens blank is made of diethylene glycol bis-allyl carbonate polymer, the surface roughness $R_q$ of the fined but unpolished main face is generally about 1.0 µm, whereas when the lens blank is made of polycarbonate, the surface roughness of the fined but unpolished main face is generally about 0.5 µm.

The lens blank and generally any article that can be treated by the process of the invention may also be a fined but not polished lens blank which has been previously coated by conventional coating processes such as spin coating, flow coating and spray coating.

Indeed, as explained previously, such a conventional coating process is not able to suppress fining lines visible by arc lamp illumination.

The process of the invention will be particularly preferred for lenses which have been coated, using conventional processes, with a thin coating film of less than 5 µm, preferably less than 2 µm.

Preferably, the process of the invention is used for coating fined but unpolished lens blanks.

The lens blank can be a lens having one or both of its main faces surfaced or casted to the required geometry (a lens having only one of its main faces or casted to the required geometry is called a semi-finished lens).

Preferably, the lens blank has a first face conferring progressive power and a second face conferring non-progressive power, but of spherical or torical shape onto which coating application according to the invention process is preferably performed. Preferably, the progressive face is the front face of the blank. However, if the progressive face is on the back face of the lens or lens blank, it is possible to apply the coating on the back face using the process of the invention.

The lens blank can also be a semi-finished lens wherein one face of the lens, preferably the front face of the lens has previously been treated with an appropriate coating (antireflective, hard coat, etc. . . . ) and the remaining face, preferably the rear face, of the lens is coated using the process of the invention. The lens blank can be a polarized lens.

The lens blank can be pre-treated before applying the process of the invention.

The pre-treatment can be physical, for example a plasma treatment, or chemical, for example a solvent treatment or a NaOH treatment.

Preferably, the fined and unpolished coated main face of the lens blank is the back concave main face of the lens.

However, the front convex main face or both main faces of the lens blank can be fined and unpolished and directly coated using the process of the invention.

The curable liquid coating composition can be any well known curable liquid coating composition typically used for forming functional coatings in the optical lens field, such as in particular primer coating compositions (improving adhesion of subsequent coating onto the lens blank), impact-resistant coating compositions, and anti-abrasive hard coating compositions.

Preferred impact-resistant and primer coating compositions are polyurethane latex or acrylic latex compositions.

Preferred anti-abrasion hard coating compositions comprise a hydrolyzate of one or more epoxysilane(s) and one or more inorganic filler(s) such as colloidal silica.

The curable liquid coating compositions can be thermally cured or cured through light irradiation, in particular UV irradiation or both. Preferably, the curable liquid coating compositions are UV curable coating compositions and in particular UV curable anti-abrasion hard coating compositions.

After application and cure of the coating composition according to the process of the invention, the resulting cured coating has generally a thickness ranging from 1 to 50 µm, preferably from 1 to 25 µm and more preferably from 1 to 10 µm, typically of about 5 µm.

Preferably, $R_q$ of the coated face of the optical article is under 0.01 µm.

The curable liquid coating composition is preferably deposited onto the fined and unpolished main face of the lens blank in the form of a drop in the centre of the face or of several drops on different points of the main face.

The amount of curable liquid coating composition must be sufficient to at least fill up the grooves of the surface roughness and form a uniform layer on the entire surface area of the main face.

The mold part may be rigid and its internal face inversely replicates said main face of the optical article.

The mold part may be flexible and its internal face inversely replicates said main face of the optical article under the pressure applied in step (v).

The pressurizing flexible mold part can be a flexible wafer, preferably having higher base curvature than the curvature of the fined and unpolished lens blank to be coated, especially when the back side of the lens blank is to be coated.

In this patent application, when one refers to the base curvature of the mold part, one means the base curvature of the working surface of the mold part, that is to say the surface which bears the coatings to be transferred to the lens or lens blank.

In the same way, base curvature of the lens or lens blank means the base curvature of the surface to which the coatings are going to be transferred from the above cited mold part.

In this application, the base curvature has the following definition:

For a spheric surface, having a radius of curvature R, base curvature (or base)=530/R(R in mm).

Such definition is quite classical in the art.

For a toric surface, there are two radii of curvature, and one calculates, according to the above formula, two base curvatures BR, Br with BR<Br.

The flexible wafer can be made of any appropriate material, preferably of a flexible plastic material, especially a thermoplastic material and in particular of polycarbonate.

The working surface of the flexible wafer i.e. the surface of the wafer in contact with the curable liquid coating composition may have a relief organized according to a pattern, in other words, may be microstructured and may confer to the final lens an optical surface having the properties imparted by the microstructure (for example antireflective properties).

Different techniques for obtaining a microstructured mold part are disclosed in WO99/29494.

When using this flexible wafer, it is only necessary to provide the wafer with a surface the geometry of which conforms to the general shape of the optical surface of the lens blank onto which the coating is to be applied, either a concave or convex shape, but it is not necessary that this surface strictly corresponds to the geometry of the lens blank surface to be coated. Thus, the same flexible wafer can be used for applying coatings onto lens blanks having surfaces of different specific geometries. Generally, the flexible wafer has two parallel main surfaces and consequently has an even thickness.

Flexible wafers typically have a thickness of 0.2 to 5 mm, preferably of 0.3 to 5 mm. More preferably, the flexible wafer is made of polycarbonate, and in this case the thickness is from 0.5 to 1 mm.

Preferably, the flexible wafers are light transparent, in particular the UV light, thus permitting UV curing of the coating composition.

According to the invention, a pressure is exerted on the external surface of the wafer (i.e. the surface of the wafer which is not in contact with the coating composition) and is preferably substantially maintained at least up to the gelling of the composition. Maintaining the pressure can be effected through the use of an inflatable membrane placed on the external surface of the wafer.

The applied pressure usually ranges from 10 to 350 kPa (3.5 kgf/cm$^2$), and preferably from 30 to 150 kPa, even better 30 to 100 kPa.

As previously mentioned, pressurization of the flexible wafer may be effected using an inflatable membrane.

The inflatable membrane can be made of any elastomeric material which can be sufficiently deformed by pressurization with appropriate fluid for urging the flexible wafer against the lens or lens blank in conformity with the surface geometry of the lens or the lens blank.

Typically, the inflatable membrane has a thickness ranging from 0.50 mm to 5.0 mm and an elongation of 100 to 800%, and a durometer 10 to 100 Shore A.

If the coating composition is thermally cured, then the material of the inflatable membrane shall be selected to bear the curing temperature.

If the coating composition is UV cured, then a transparent material shall be selected, for example a transparent silicone rubber or other transparent rubbers or latexes: the UV light is preferably irradiated from the mold part side.

The pressure applied to the mold part by the inflatable membrane typically ranges from 10 kPa to 150 kPa and will depend on the lens or lens blank and flexible wafer sizes and curvatures. Of course, the pressure needs to be maintained onto the flexible wafer and the lens or lens blank until the coating composition is sufficiently cured so that enough adhesion of the coating to the lens or lens blank is obtained.

The flexible part of the process of the invention may be the inflatable membrane itself described above, in particular an inflatable membrane of an air accumulator apparatus. In that case, of course, no flexible wafer is used.

Similar pressures as with a flexible wafer are used with the inflatable membrane.

Either the wafer or the inflatable membrane can be precoated, for example with a release coating, to exhibit good optical surface for keeping optical grade of the coated lens blank.

As for the flexible wafer, the inflatable membrane may comprise in its surface contacting the coating composition a micro-structure or pattern that will be duplicated in the lens blank coating during the coating process.

The final coated lens blanks obtained by the process of the invention have very good optical quality and they have no visible fining lines under arc lamp illumination.

BRIEF DESCRIPTION OF THE DRAWINGS

The foregoing and other objects, features and advantages of the present invention will become readily apparent to those skilled in the art from a reading of the detailed description hereafter when considered in conjunction with the accompanying drawings wherein.

DETAILED DESCRIPTION OF THE PREFERRED EMBODIMENT

Figure 1A:
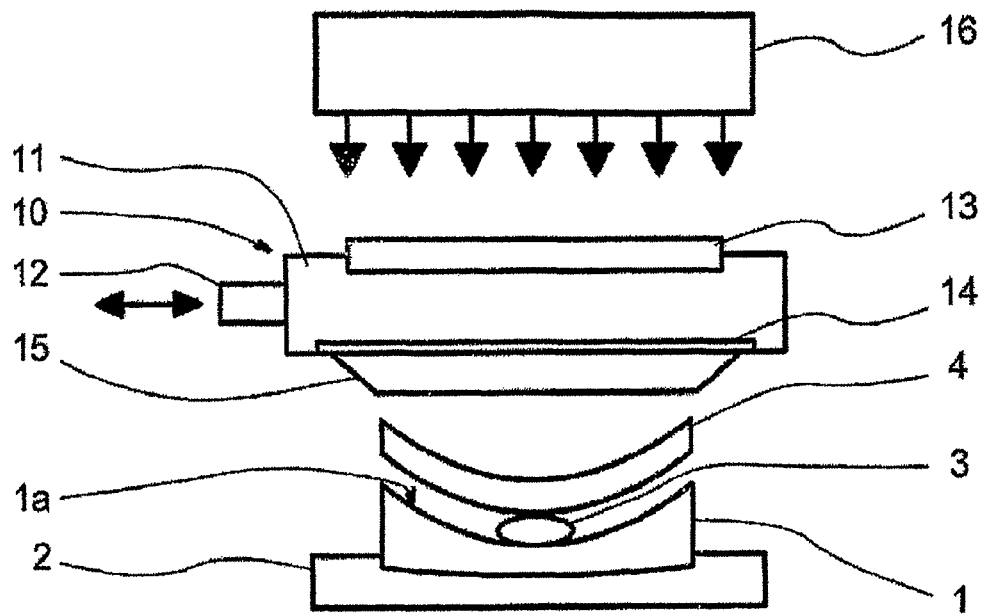
FIGS. 1A and 1B are schematic views of the main steps of a first embodiment of the process of the invention for forming a coating onto fined but unpolished main face of a lens blank, using a flexible wafer as the flexible part.
Figure 1B:
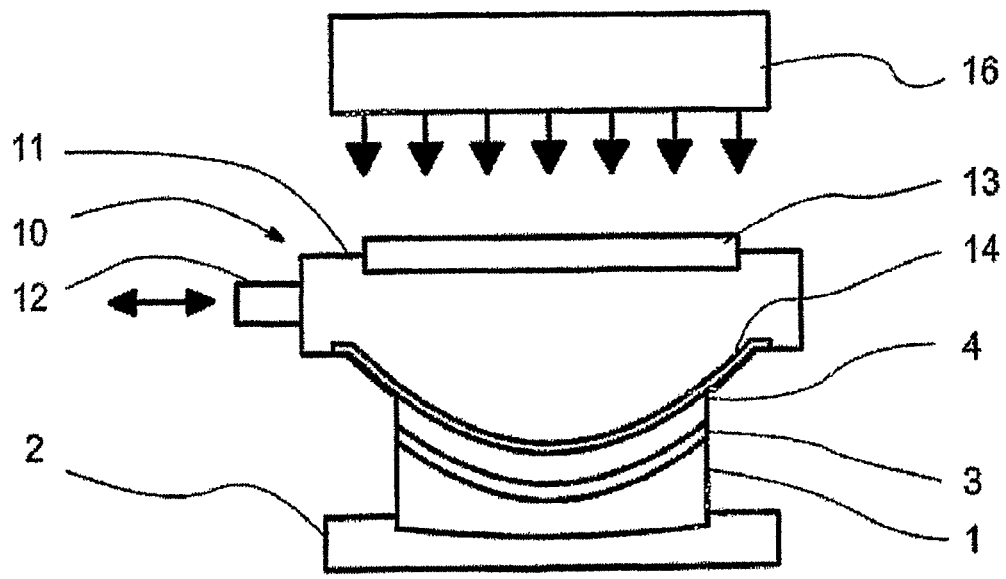

FIGS. 1A and 1B are schematic views of an embodiment of the process of the invention in which the coating is performed through a flexible wafer urged against the lens blank fined and unpolished main face using an inflatable membrane apparatus.

FIG. 1A shows the lens blank 1, flexible wafer 4 and inflatable membrane 14 before pressurization and inflatation of the membrane, whereas FIG. 1B shows the same after pressurization and inflatation of the membrane 14.

Although, the following description will be made in connection with UV curing of the liquid coating composition, similar apparatus and process can be used with a thermally curable coating composition.

Referring to FIG. 1A, a lens blank 1, for example a toric lens blank, is placed in a lens blank support 2 with its fine but unpolished geometrically defined main face 1a facing outwardly.

A drop of UV curable liquid coating composition 3 is deposited at the center of the geometrically defined main face 1a of the lens blank 1.

A thin flexible wafer 4, for example a spheric wafer, is placed on the coating composition.

The whole assembly is then placed in front of the membrane 14 of an inflatable membrane apparatus 10.

The inflatable membrane apparatus 10 comprises a fluid accumulator 11, for example an air accumulator provided with fluid port 12, for example an air port connected to a pressurized fluid source (not represented) for introducing pressurized fluid within the accumulator and also evacuating pressurized fluid from the accumulator. The upper face of the accumulator 10 comprises a light transparent portion 13, for example a UV transparent quartz glass portion, whereas the lower face of the accumulator 10 comprises a transparent inflatable membrane 14 in register with the transparent quartz glass 13.

As shown in FIG. 1A, the apparatus 10 further comprises a guiding means 15 for laterally guiding the inflatable membrane 14 during inflatation thereof. More specifically, this guiding means comprises a trunconical part or funnel 15 projecting outwardly from the lower face of the accumulator 10 and whose greater base is obturated by the inflatable membrane 14 and whose smaller base is a circular opening having a diameter at least equal to the base diameter of the flexible wafer 4 but preferably slightly larger (up to 5 mm larger).

Typically, the funnel height will range from 10 to 50 mm, preferably 10 to 25 mm, and will have a taper of 10 to 900, preferably 30 to 50°.

Finally, a light source, for example a UV light source 16 is placed behind the accumulator 10 in front of the transparent quartz plate 13.

Generally, the assembly comprising the lens blank holder 2, the lens blank 1, the coating composition drop 3 and the flexible wafer 4 is placed so that the rim of the flexible wafer 4 be within the plan of the rim of the smaller base opening of funnel 15 or separated therefrom by a distance up to 50 mm, preferably up to 20 mm.

As shown in FIG. 1B, a pressurized fluid, such as pressurized air, is introduced into the accumulator 11 from an external source (not represented) through entrance 12. The pressure increase within the accumulator, inflates the inflatable membrane 14 and, thanks to the membrane guiding means 15, the membrane 14 uniformly urges the flexible wafer 4 against the lens blank 1, while uniformly spreading the coating composition 3.

The coating composition is then UV-cured.

After completion of the curing step, the lens blank 1 is disassembled from the holder 2 and the flexible wafer 4 is removed to recover a lens blank 1 whose geometrically defined surface 1a is provided with a coating.

Of course, in case of a thermal curing process, light source and transparent portion of the upper face of the accumulator are not needed.

In this case also, the inflatable membrane needs not to be transparent. Otherwise, the apparatus remains the same.

Figure 2A:
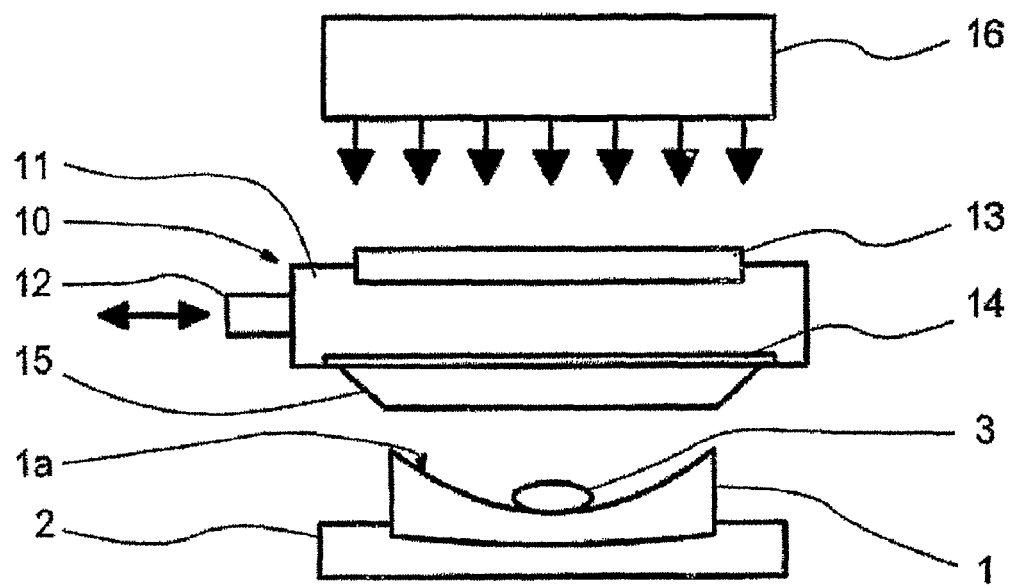
FIGS. 2A and 2B are schematic views of the main steps of a second embodiment of the process of the invention using directly the inflatable membrane of an air accumulator apparatus as the flexible part.
Figure 2B:
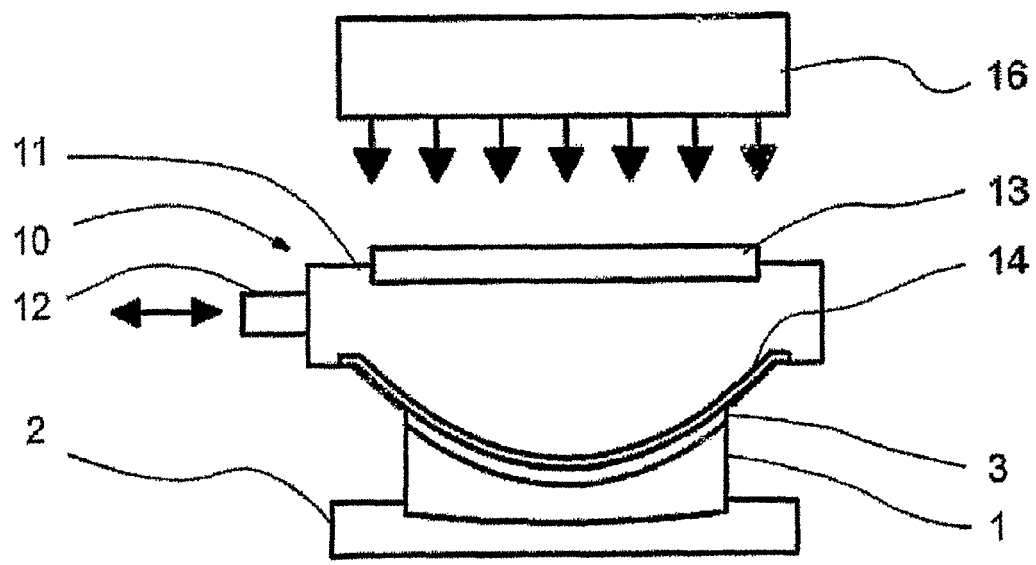

FIGS. 2A and 2B are schematic views of another embodiment of the process in which the inflatable membrane 14 of the apparatus 10 is directly used as the flexible part for uniformly spreading the UV curable liquid coating composition 3 on the fined but unpolished main face Ia of the lens blank 1.

Otherwise, the coating process proceeds in a similar manner as disclosed in connection with FIGS. 1A and 1B.

In the description and the following examples the surface roughness Sq of the fined but unpolished main face of the lens blank is as follows:

$S_q$: Quadratic mean of the deviations from the mean $$S_q = \sqrt{\frac{1}{NM} \sum_{x=1}^{N} \sum_{y=1}^{M} Z_{x,y}^2}$$

Computes the efficient value for the amplitudes of the surfaces (RMS). This parameter is included in the EUR 15178 EN report (Commission of the European Communities) Stout et Al 1993: The development of methods for the characterisation of roughness in three dimensions.

The roughness ($S_q$) is measured by P-10 Long Scan of KLA-Tencor.

The measurement condition was under 2 μm tip 1 mg force 10 scans 500 μm long 2000 data points.

In the description and the following examples, $$R_q = \sqrt{\frac{1}{N} \sum_{n=1}^{N} (Zn)^2}$$

Rq is determined as follows:

A TAYLOR HOBSON FTS (Form Talysurf Series 2) profilometer/roughness measuring system is advantageously used to determined the root-mean-square profile height Rq (2 DRq) of the surface (also referred as roughness Rq before).

The system includes a laser head (product reference 112/2033-541, for example) and a 70 mm long feeler (product reference 112/1836) having a 2 mm radius spherical/conical head.

The system measures a two-dimensional profile in the chosen section plane to obtain a curve Z=f(x). In this example the profile is acquired over a distance of 20 mm.

Various surface characteristics can be extracted from this profile, in particular its shape, undulation and roughness.

Accordingly, to determine Rq, the profile is subject to two different processes, namely shape extraction and filtering, which corresponds to mean line extraction.

The various steps for determining a parameter Rq of this kind are as follows:

acquisition of the profile Z=f(x), shape extraction, filtering (mean line extraction), and determination of parameter $R_q$.

The profile acquisition step consists in moving the stylus of the aforementioned system over the surface of the lens in question, to store the altitudes Z of the surface as a function of the displacement x.

In the shape extraction step, the profile obtained in the previous step is related to an ideal sphere, i.e. a sphere with minimum profile differences relative to that sphere. The mode chosen here is the LS arc mode (best circular arc extraction).

This provides a curve representative of the characteristics of the profile of the surface in terms of undulation and roughness.

The filtering step retains only defects corresponding to certain wavelengths. In this example, the aim is to exclude undulations, a form of defect with wavelengths higher than the wavelengths of defects due to roughness. Here the filter is of the Gaussian type and the cut-off used is 0.25 mm.

$R_q$ is determined from the curve obtained using the following equation:

$$R_q = \sqrt{\frac{1}{N}\sum_{n=1}^{N}(Zn)^2}$$

where Zn is, for each point, the algebraic difference Z relative to the mean line calculated during filtering.

The grinding and fining process used in the examples is V-95 grinding followed by fining with a 15 μm pad (from 3M).

V-95 is a computer controlled grinding machine from LOH company with 3D disk cutter. The grinding time is about 1 to 2 minutes;

Haze has been measured by Haze-Gard Plus made by BYK Gardner;

Inspection with an arc lamp is carried out by using a BT X 75/LIS//Lamp made by Bulbtronics Inc. the light from the above lamp is directed towards the lens and the reflected light is projected on a screen. The image of the lens on the screen is visually inspected in order to see if there are fining lines.

Example 1

A semi-finished lens SF lens made of diéthyleneglycol bis-allyl carbonate copolymer (CR-39®) was generated by V-95 and fined with 15 μm pad to a −1.25 power lens (back curvature 5.0 base, diameter 70 mm) without polishing. Fining process is done with LOH Toro-X-S/SL fining machine using a 15 μm pad made by 3M. The fining time is about 1 to 2 minutes. The lens was then washed with water and soap and coated with an abrasion-resistant coating by the process of the invention using a thin flexible wafer and the inflatable membrane apparatus as described in connection with the figures.

5 drops of the liquid coating composition (0.12 g in total) are deposited on the fined main face of the lens. The thin flexible wafer is carefully placed on the liquid coating composition drops.

The resulting assembly is then placed in front of the inflatable membrane of the air accumulator and air is introduced up to a pressure of 84 kPa (12 Psi) so that the liquid coating composition is spread out in the entire fined main face of the lens.

The coating composition is then UV cured for 30 seconds using a UV lamp with high intensity 145 mW/cm² and wavelength from 330 to 490 nm. After separation, there is obtained a clear coating layer on the lens without any visible fine lines by illumination with an arc lamp.

UV Curable Liquid Coating Composition, in Weight %:

| | |
|---|---|
| UVR-6110 (3,4-epoxycyclohexyl methyl-3,4-epoxycyclohexane carboxylate) | 13 |
| GE 21 (1,4-butanediol digiycidyl ether) | 30.29 |
| HDODA (hexane diol diacrylate) | 10.85 |
| SR-399 (dipentaerythritol pentaacrylate) | 30.36 |
| SR 230 (diethyleneglycol diacrylate) | 7.01 |
| IBOA (isobornyl acrylate) | 2.29 |
| UVI 6974 (cationic photoinoitiator) | 5.25 |
| IRGACURE 500 (free radical initiator) | 0.82 |
| SLF-18 (hydrocarbon base surfactant) | 0.1 |

Flexible Wafer:

A wafer made of polycarbonate with 0.6 mm thick piano sphere shape having a 5.50 base curve and a 68 mm diameter. The wafer is made by injection molding and is precoated with a release and protective coating solution.

Example 2

Example 1 is reproduced except using a liquid coating composition of refractive index $n_D^{25}=1.532$ This liquid composition has the following formulation, in weight %

| | | |
|---|---|---|
| EPON 228 (bisphenol A epoxy resin) | 60 | |
| GE 21 (1,4-butanediol diglycidyl ether) | 40 | |
| IRGACURE 552 (photoinitiator) | 4 | phr |
| ITX (sensitizer) | 0.2 | phr |

Comparative Example 1

Example 1 is reproduced except using spin coating process and cured by conveyor UV with the same coating solution. The results showed that even a much thick coating layer on a fining lens (60×Rq of surface roughness) by spin could not cover the fining mark. The spin coating was done by Headway Spin Coat and spinning speed was 600 rpm for 12 seconds and 2000 trm for 4 seconds. Thereafter, curing was effected using a Fusion UV conveyor at 9 mm H bulb, 692 mW/cm² at 350 nm.

Comparative Example 2

Example 1 is reproduced except using high index ($n_D^{25}=1.57$) coating solution. This coating solution has the following formulation, in weight %:

| | | |
|---|---|---|
| Diethyleneglycol diacrylate | 30 | |
| Ethoxylated-8 bisphenol A diacrylate | 30 | |
| Bis(2-methacryloylthioethyl) sulfide | 40 | |
| IRGACURE 819 (photoinitiator) | 3 | phr |

Example 3

A PC SF lens was generated by V-95 and fined with 15 μm pad to −2.00 power lens (back curve=5.0 base) without polishing. The lens was then washed with soap and water and the same coating solution as in comparative example 2 is applied as in Example 1.

Comparative Example 3

Example 3 is reproduced except using the same low index ($n_D^{25}=1.518$) coating solution as in example 1.

Comparative Example 4

Example 3 is reproduced except using a flow coating method. Flow coating is similar to dip coating which still cannot cover the fining lines in arc lamp even though the coating thickness is higher than $10\times S_q$ of surface roughness and the haze level is low.

In that example, 5 g of coating liquid was manually smoothly applied on the fined lens surface and turned around to let the liquid wet the whole surface. Then, the coating was cured using a Fusion UV conveyor at 9 mm H bulb, 692 mW/cm² at 350 nm.

Example 4

A CR-39® SF lens was generated by V-95 and fined with 15 μm pad to −1.25 power lens without polishing. The lens was then tinted in BPI black bath, commercially available, at 95° C. for 15 min. After that, the tinted CR-39 lens was press coated by the same method as Ex. 1 with the commercial UV curable coating solution (HT-1000 from GERBER COBURN Inc.). The obtained lens has very good uniform color and very good transmission and low haze level. There is no any fining line seen in arc lamp after press coating.

Example 5

A CR-39 SF® lens was generated by V-95 and fined with 15 μm pad to −1.25 lens without polish. After that, it was press coated by the same method as in example 1 with the commercial UV curable coating solution (HT-1000 from Gerber Coburn Inc.). The obtained lens has very good transmission and low haze level. There is no any fining line seen in arc lamp after press coating. The lens was then coated with an antireflective coating by using BAK 760 vacuum machine. It has the same properties as a commercial hard multicoated CR-399 lens made using a polishing step.

TABLE 1

| Ex. | Lens materials | Fining process | Surface roughness (Rq) | Haze before coating | Coating refractive index $n_D^{25}$ | Coating process | Thickness of coating | Haze after coating | Fining mark in arc lamp |
|---|---|---|---|---|---|---|---|---|---|
| Ex. 1 | CR-39 | V-95 + 15 μm fining (2 min) | 0.3787 [μm] | 89.8 | 1.518 | Press coating | −5 μm | 0.37 | No |
| Ex. 2 | CR-39 | V-95 + 15 μm fining (2 min) | 0.3943 [μm] | 89.8 | 1.532 | Press coating | −5 μm | 1.50 | No |
| Com. 1 | CR-39 | V-95 + 15 μm fining (2 min) | 0.3758 [μm] | 89.8 | 1.518 | Spin coating | −25 μm | 0.35 | Yes |
| Com. 2 | CR-39 | V-95 + 15 μm fining (2 min) | 0.3831 [μm] | 89.8 | 1.57 | Press coating | — | 6.70 | Yes |
| Ex. 3 | PC | V-95 + 15 μm fining (2 min) | 0.2089 [μm] | 83.1 | 1.57 | Press coating | — | 1.17 | No |
| Com. 3 | PC | V-95 + 15 μm fining (2 min) | 0.2181 [μm] | 83.1 | 1.518 | Spin coating | — | 2.40 | Yes |
| Com. 4 | PC | V-95 + 15 μm fining (2 min) | 0.2163 [μm] | 83.1 | 1.57 | Flow coating | >25 μm | 1.15 | Yes |

Thickness of coating layers was measured by using cross-sectioned samples in microscopy of Nikon Optiphot-2 with 600× of Epi illumination.

Example 6

Example 1 was reproduced by using a very low viscosity (7 cps) coating solution consisting of, by weight, 89% diethyleneglycol dimethacrylate and 11% bis-2-[(meth)acryloylthioethyl]sulfide (BMTES), with 3 phr photoinitiator/CGI-819 (Irgacure 819 from Ciba-Geigy: bis(2,4,6-trimethylbenzoyl)-phenylphosphineoxide). The refractive index $n_D$ (25° C.) of the coating solution was 1.472. The observed coating thickness after curing is around 1-2 micrometers. There is no fining mark seen in the arc lamp after press coating although the coating thickness is very thin.

Example 7

A 20 micrometers pad fined but not polished glass mould with surfaced roughness of Sq=0.58 μm was press coated by the same method as in example 1 with the commercial UV curable coating solution (HT-1000). The obtained glass mould has very good transmission and low haze level. There is no any fining line seen in the arc lamp after press coating.

Comparative Example 5

The same fined but not polished glass mould as in Example 7 was spin coated using Ultra Optics coating machine with HT-1000 UV curable coating solution. The obtained glass has a lot of fining lines seen in the arc lamp.

The invention claimed is:

1. A process for making a coated optical article free of visible fining lines by application of a single monolayer coating, wherein the process comprises:
   (i) providing an optical article having at least one fined but unpolished geometrically defined main face having a root mean square profile $R_q$ higher than or equal to 0.01 μm;
   (ii) providing a mold part having an internal and external surface;
   (iii) depositing on said main face of said optical article or on the internal surface of the mold part a requisite amount of a liquid curable coating composition;
   (iv) moving relatively to each other the optical article and the mold part to either bring the coating composition into contact with the main face of the optical article or into contact with the internal surface of the mold part;
   (v) applying pressure to the mold part to spread the liquid curable coating composition on said main face and form a uniform liquid coating composition layer onto the main face, wherein the pressure exerted onto the mold part ranges from 10 kPa to 350 kPa and is maintained at least up to the gelling of the liquid coating composition layer;
   (vi) curing the liquid coating composition layer;
   (vii) withdrawing the mold part; and
   (viii) recovering an optical article free of visible fining lines and having said at least one fined but unpolished geometrically defined main face coated with a single monolayer coating having a thickness of less than 5 μm.

2. The process of claim 1, wherein the liquid coating composition layer is cured under pressure.

3. The process of claim 1, wherein said mold part is rigid and its internal face inversely replicates said main face of said optical article.

4. The process of claim 1, wherein said mold part is flexible and the geometry of its internal face inversely replicates said main face of said optical article under the pressure applied in step (v).

5. The process of claim 4, wherein the flexible part has a higher base curvature than the base curvature of the fined and unpolished optical article to be coated.

6. The process of claim 4, wherein the flexible mold part is an inflatable flexible membrane.

7. The process of claim 4, wherein the flexible mold part has a thickness of 2 mm or less.

8. The process of claim 4, wherein the flexible mold part is made of flexible plastic material.

9. The process of claim 8, wherein the flexible plastic material comprises polycarbonate or poly(methylmethacrylate).

10. The process of claim 1, wherein the curable liquid coating composition is a UV curable composition.

11. The process of claim 1, wherein the mold part is a transparent wafer.

12. The process of claim 11, wherein the mold part is a UV transparent wafer.

13. The process of claim 1, wherein the pressure exerted onto the mold part ranges from 30 to 150 kPa.

14. The process of claim 1, wherein $R_q$ of the fined but unpolished geometrically defined main face ranges from 0.01 to 1.5 µm.

15. The process of claim 1, wherein $R_q$ of the fined but unpolished geometrically defined main face ranges from 0.1 to 1.0 µm.

16. The process of claim 1, wherein the optical article is made of polycarbonate.

17. The process of claim 1, wherein said main face of the optical article has a $R_q$ of about 0.5 µm.

18. The process of claim 1, wherein the optical article is made of diethylene glycol bis-allylcarbonate, polycarbonate, polythiourethane or episulfide material.

19. The process of claim 1, wherein said main face of the optical article has a surface roughness $S_q$ of about 1.0 µm.

20. The process of claim 1, wherein the single monolayer coating has a thickness of 1 to less than 5 µm.

21. The process of claim 1, wherein the refractive index difference between the optical article and the cured coating is up to 0.1.

22. The process of claim 1, wherein the coating composition is an anti-abrasive hard coating composition.

23. The process of claim 1, wherein the said main face of the optical article is the back face of the optical article.

24. The process of claim 1, wherein the optical article is a tinted lens blank.

25. The process of claim 1, further comprising applying an anti-reflective coating directly onto the cured coating.

26. The process of claim 1, wherein said optical article is a lens or lens blank.

27. The process of claim 26, wherein said optical article is a tinted lens or lens blank.

28. The process of claim 26, wherein said main face of the lens or lens blank is the back face of the lens or lens blank.

29. The process of claim 1, wherein said optical article is a transparent lens mold.

30. The process of claim 29, wherein said lens mold is a glass mold.

31. The process of claim 30, further comprising applying an anti-reflective coating directly onto the cured coating.

32. The process of claim 1, wherein the mold part is precoated by a release coating and/or protective coating.

33. The process of claim 1, wherein the mold part has a microstructure or a pattern to be duplicated in the lens blank coating.

34. The process of claim 1, wherein the liquid curable coating composition fills up the grooves of the surface roughness and forms a uniform layer on the entire surface area of said main face.

35. A process for making a coated article whose main surface has a surface state corresponding to a polished state by application of a single monolayer coating, wherein the process comprises:
(i) providing an article having at least one fined but unpolished geometrically defined main face having a root mean square profile $R_q$ higher than or equal to 0.01 µm;
(ii) providing a mold part having an internal and external surface;
(iii) depositing on said main face of said article or on the internal surface of the mold part a requisite amount of a liquid curable coating composition;
(iv) moving relatively to each other the article and the mold part to either bring the coating composition into contact with the main face of the article or into contact with the internal surface of the mold part;
(v) applying pressure to the mold part to spread the liquid curable coating composition on said main face and form a uniform liquid coating composition layer onto the main face of the article, wherein the pressure exerted onto the mold part ranges from 10 kPa to 350 kPa and is maintained at least up to the gelling of the liquid coating composition layer;
(vi) curing the liquid composition layer;
(vii) withdrawing the mold part; and
(viii) recovering a coated article having a surface state corresponding to a polished state and having a single monolayer coating with a thickness of less than 5 µm.

36. The process of claim 35, wherein the surface of the coated article has a $R_q$ under 0.01 µm.

37. The process of claim 36, wherein the coated article is a lens mold.

38. The process of claim 37, wherein the lens mold is not transparent.

39. The process of claim 35, wherein the mold part is precoated by a release coating and/or protective coating.

40. The process of claim 35, wherein the mold part has a microstructure or a pattern to be duplicated in the lens blank coating.

41. The process of claim 35, wherein said fined but unpolished geometrically defined main face of the article has a $R_q$ of about 0.5 µm.

42. The process of claim 35, wherein said fined but unpolished geometrically defined main face of the article has a surface roughness $S_q$ of about 1.0 µm.

43. The process of claim 35, wherein the liquid curable coating composition fills up the grooves of the surface roughness and forms a uniform layer on the entire surface area of said main face.

* * * * *